United States Patent [19]

Kasman

[11] Patent Number: 5,137,582

[45] Date of Patent: Aug. 11, 1992

[54] THERMOCOUPLE ASSEMBLY

[76] Inventor: David H. Kasman, 19 Ridge Rd., Holliston, Mass. 01746

[21] Appl. No.: 613,284

[22] Filed: Nov. 14, 1990

[51] Int. Cl.⁵ .......................................... H01L 35/02
[52] U.S. Cl. .................... 136/233; 136/201; 136/230; 136/232
[58] Field of Search .............. 136/201, 200, 230, 232, 136/233, 234

[56] References Cited

U.S. PATENT DOCUMENTS

| | | | |
|---|---|---|---|
| 845,413 | 2/1907 | Haagn . | |
| 2,365,207 | 12/1944 | Moles | 171/95 |
| 2,473,779 | 3/1945 | Benioff | 136/4 |
| 2,794,059 | 3/1953 | Smith | 136/4 |
| 2,906,800 | 9/1959 | Darken | 136/4 |
| 3,069,752 | 12/1962 | Sherning | 29/155.5 |
| 3,477,122 | 11/1969 | Hamrick | 29/573 |
| 3,499,310 | 3/1970 | Hundere et al. | 73/1 |
| 3,713,899 | 1/1973 | Sebestyen | 136/233 |
| 4,485,263 | 11/1984 | Itoyama et al. | 136/230 |
| 4,830,515 | 5/1989 | Cortes | 374/208 |

Primary Examiner—Brooks H. Hunt
Assistant Examiner—Chrisman D. Carroll
Attorney, Agent, or Firm—Cesari and McKenna

[57] ABSTRACT

A thermocouple assembly includes a protective housing, preferably made of glass, a thermocouple suspended in the housing, and a thermally conductive material that fills the space between the inner wall of the housing and the thermocouple. In a preferred embodiment, a compressible ring is used to both confine the thermally conductive material and prevent damage to the thermocouple assembly caused by thermal expansion or contraction.

24 Claims, 1 Drawing Sheet

THERMOCOUPLE ASSEMBLY

FIELD OF THE INVENTION

This invention relates generally to a thermocouple assembly, and particularly to such an assembly in which a thermocouple is mounted in a glass tube or the like.

BACKGROUND OF THE INVENTION

A conventional thermocouple consists of a temperature-sensitive element to which electrical conductors are attached. The temperature-sensitive element produces a voltage or current which is related (e.g., proportional) to the ambient temperature around the element. Many such thermocouples include a outer jacket which encloses the temperature-sensitive element and conductors.

Since air is known to be a poor heat-conductor, any air space between the jacket and the temperature-sensitive element tends to increase the response time of the thermocouple to changes in ambient temperature. Thus, it is important that the jacket be in intimate contact with the temperature-sensitive element.

U.S. Pat. No. 845,413 to E. Haagn discloses an electric-resistance thermometer in which an outer glass sheath is melted onto a platinum wire which is wound around a glass rod. While no space appears to exist between the sheath and the wire in the Haagn device, this is achieved by a rather expensive and difficult process which involves evacuating the air within the sheath and heating it at a temperature as high as 1500° C. More importantly, the Haagn device does not include a mechanism for relieving stress caused by differences in rates of thermal expansion or contraction between the wire and the glass.

Metal-jacketed thermocouples have long been commercially available. While a metal sheath offers protection to the temperature-sensitive element and conductors which it surrounds, the metal sheath itself is nonetheless vulnerable to the corrosive or oxidative substances present in detrimental atmospheric conditions or baths to which a thermocouple assembly is frequently subjected.

It is disclosed in U.S. Pat. No. 3,069,752 to Sherning that a metal-jacketed thermocouple is fitted into another protective sheath made of graphite to isolate the metal sheath from the ambience. There are several drawbacks associated with the use of a graphite sheath in a thermocouple assembly.

First, during assembly, a carbonaceous or key graphite paste has to be used to fill any voids, which inevitably exist between the thermocouple and the sheath, in order to shorten the response time of the thermocouple instrument thus assembled. The paste is subsequently dried out via a gradual and slow heating process. Thus, it is somewhat tedious to assemble such an instrument. Further, differentials in thermal expansion or contraction of the metal and graphite sheaths may cause one or both to rupture. In addition, graphite is a rather brittle and fragile material and thorough cleaning of a graphite-sheathed thermocouple may be difficult or uneconomical.

There exists a need, therefore, to provide a sheathed thermocouple instrument which provides a relatively rapid response to changes in ambient temperature, is easy to assemble and clean, is relatively sturdy and durable, is operative over a wide temperature range and which compensates for stress induced by rapid temperature change or extreme temperatures.

SUMMARY OF THE INVENTION

Accordingly, it is a general object of the present invention to provide a thermocouple assembly in which the thermocouple is mounted in a protective sheath.

Another object of the present invention is to provide a thermocouple assembly of this type which has a relatively fast response time.

A further object of the present invention is to provide a thermocouple assembly of this type which is not only easy to fabricate, but also easy to clean.

Yet another object of the present invention is to provide a thermocouple assembly of this type which is protected against damage caused mechanical stress induced by either extreme temperatures or rapid temperature changes.

It is still another object of the present invention to provide a thermocouple assembly of this type which is relatively inexpensive to make.

It is a further object of the present invention to provide a thermocouple assembly of this type which has a relatively wide operative temperature range.

It is yet another object of the present invention to provide a thermocouple assembly of this type which has a relatively long useful life.

Other objects will, in part, be obvious and will, in part appear below.

The invention accordingly comprises the features of construction, combination of elements and arrangement of parts which will be exemplified in the following detailed description, and the scope of the invention will be indicated in the claims.

Briefly and generally, the present thermocouple assembly is composed of four parts: (1) a refractory protective housing, such as a glass tube or the like, which is closed at one end, (2) a thermocouple, either enclosed in a metal jacket or not, (3) a predetermined amount of a thermally conductive and refractory powder, such as pulverized aluminum, and (4) a ring or collar, secured to the thermocouple, for maintaining the powder in a desired portion of the housing.

The thermocouple is suspended in the protective housing. The powder, on the other hand, fills at least part of the space between the inner wall of the housing and the thermocouple so as to surround the portion of the thermocouple which contains the temperature-sensitive element.

Such construction provides several important advantages. First, the housing isolates the thermocouple from any detrimental chemicals in the ambience. Second, the powder displaces any air between the thermocouple and the housing, thereby promoting efficient heat transfer between the ambience and the temperature-sensitive element. Third, the powder, in cooperation with the collar, provides "compliance" or relief from mechanical stress induced by differences in the coefficients of expansion of the housing and thermocouple.

The above-described thermocouple assembly is simply and easily made. In particular, thermocouples, glass tubes and aluminum powder all are commercially available, as is material suitable for making the collar. It is preferable to make the collar from a compressible material, such as silicone foam rubber, and to securely attach it to the thermocouple to confine the powder within the protective housing.

When such a collar is used, it is also preferable that the powder fill up the space between the collar and the closed end of the protective housing. This will prevent creation of air space between the lower portion of the thermocouple and the housing when the thermocouple is used in an inverted position. Such air space is disagreeable, since it tends to increase the response time of the thermocouple.

Preferably, a resilient cap is furnished for both sealing the top opening of the protective housing and guiding the thermocouple leads to a thermocouple meter. Use of such a cap does not only prevent loss or contamination of the powder, but also serves to relieve any strain imposed on the thermocouple leads.

BRIEF DESCRIPTION OF THE DRAWING

The above and further advantages of the invention may be better understood by referring to the following description in conjunction with the accompanying drawing, in which.

Figure 1:
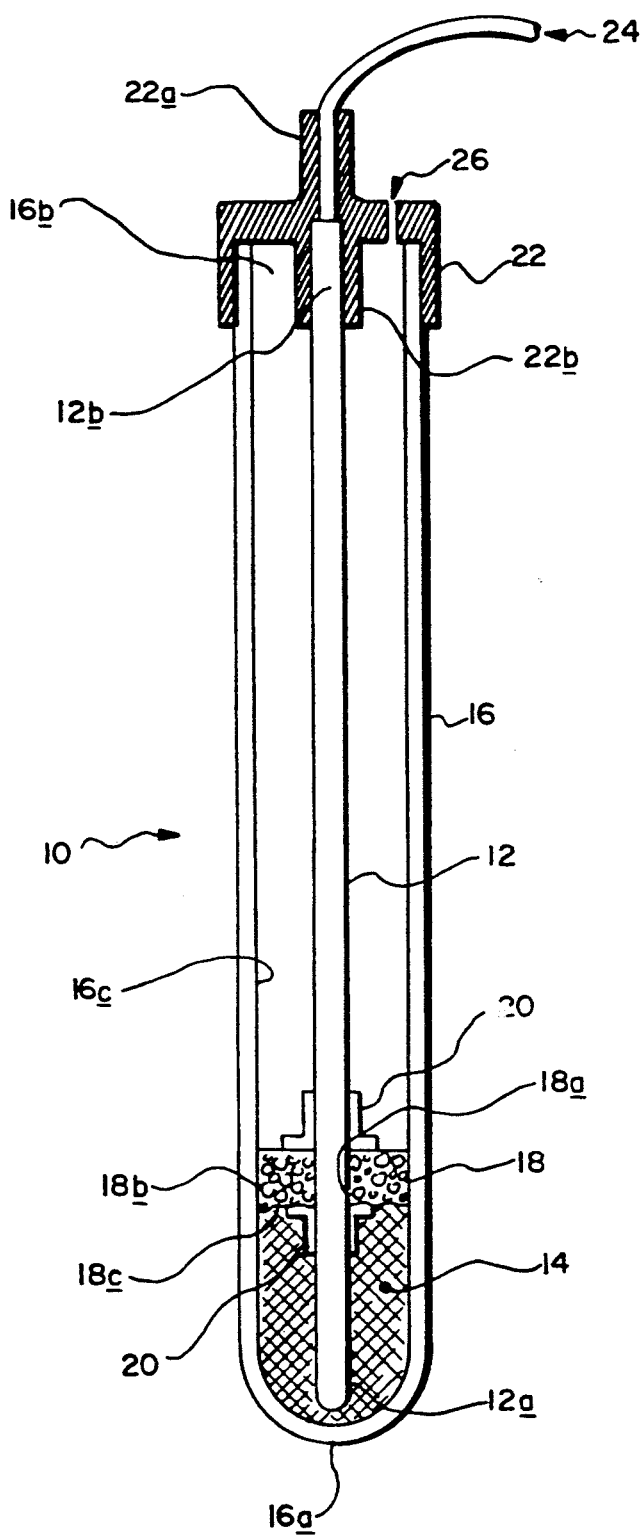
FIG. 1 is a view, partly in side elevation and partly in medial section, showing a thermocouple assembly embodied in accordance with the present invention.

As used herein, the terms such as "upper", "lower", "top", "bottom" and the like are intended only to denote relative direction solely with reference to the accompanying drawing.

DETAILED DESCRIPTION OF ILLUSTRATIVE EMBODIMENTS

FIG. 1 of the drawing depicts a thermocouple assembly, generally designated by the numeral 10, which represents a preferred embodiment in accordance with the present invention. As shown in FIG. 1, the thermocouple assembly 10 comprises Four essential parts, namely, a thermocouple 12, a powder 14, a protective housing 16 and a ring 18.

The thermocouple 12 may represent, for example, any of a number of commercially available metal-jacketed thermocouples. Other types of thermocouples may also be used.

The powder 14 a material having both good thermal conductivity and a melting point above the range of temperatures to be measured by the thermocouple 12. For example, good results have been obtained with aluminum powder.

For obvious reasons, the protective housing 16 is made of refractory material which does not melt within the range of temperatures to be measured by the thermocouple 12. Further, the housing 16 has a closed bottom 16a so that it can receive the powder 14 and also prevent the thermocouple 12 from exposure to detrimental substances in the ambience. Also provided in the protective housing 16 of the FIG. 1 assembly 10 is an open top 16b through which the thermocouple 12 and the powder 14 can be placed in the housing 16. Preferably, the housing 16 is made of a chemically inert material, such as glass or porcelain. Borosilicate glass, commonly sold under the trademark PYREX, is preferable due to its low coefficient of thermal expansion.

A conventional glass tube of a proper length and diameter can be readily adapted to form the housing 16 by sealing off or closing one of its ends in any suitable manner. Note that a glass tube does not react with most chemicals. Unlike a metal sheath, it is not susceptible to attack by most strong acids and other corrosive substances. Further, a smooth glass can be cleaned more easily and more thoroughly than protective sheaths made of materials such as metal or graphite. In addition, a glass tube of conventional size (i.e., diameter) is size-compatible with existing laboratory equipment such as stoppers and clamps.

The protective housing 16 is dimensioned so that it can accommodate the thermocouple 12. Preferably, the thermocouple 12 is suspended in the protective housing 16 as described below. Such construction is preferred, since lack of direct contact between the thermocouple 12 and the housing 16 will tend to reduce mechanical stress that is caused by expansion or contraction of the thermocouple 12 and housing 16.

It is preferred that the powder 14 substantially fill the space between the thermocouple 12 and the inner wall 16c of the housing 16, so that thermal transfer from the housing 16 to the thermocouple 12 is enhanced, while any stress caused by expansion or contraction is compensated for by slight movements of the powder.

The thermocouple 12 is held securely in place by a ring 18 and a cap 22. It is preferable that a readily compressible ring 18, such as one made from silicone foam rubber, be used to hold the thermocouple 12 in place. Alternatively, other suitable materials may be used to construct ring 18. For example, dense fiberglass material or material made of ceramic fibers may be used for applications where ambient temperatures may exceed the melting point of silicone foam rubber or where coarser powder 14 is used.

With provision of the compressible ring 18, only a minimal amount of powder 14 is needed to surround the lower portion 12a of the thermocouple 12 (in which the temperature-sensitive element is disposed). Further, the compressible ring 18 also serves to prevent loss or contamination of the powder 14 and to keep the powder in the lower portion of the housing 16 when the assembly 10 is inverted.

The compressible ring 18 is dimensioned so that, when the housing 16, the thermocouple 12 and the ring 18 are assembled in the manner shown in FIG. 1, its inner wall 18a fits snugly against the thermocouple 12 and its outer wall 18b fits snugly against the inner wall 16c of the housing 16. In other words, the ring 18 is held in place within the housing 16 by frictional engagement and the thermocouple 12, in turn, frictionally grips the ring 18 as to keep itself in a suspending relationship with respect to the housing 16. Note that the ring 18 is preferably of sufficient thickness that its frictional engagement with both the housing 16 and the thermocouple 12 is relatively strong. As will be explained below, in order to facilitate the fabrication of the thermocouple assembly 10, it is preferable that additional means, such as crimp-on stops 20, be used to more securely fix the position of the ring 18 with respect to the thermocouple 12.

If desired, some air space may be provided between the underside 18c of the ring 18 and the powder 14 so that when thermal expansion occurs, there is always some leeway to avoid damage to the assembly 10. However, such provision is generally not necessary when a compressible ring 18 is used, since compressibility (compliance) of the ring 18 provides adequate protection against such damage even if there is no air space between the powder 14 and the ring 18. One advantage associated with a thermocouple assembly in which no such air space (e.g., the assembly 10 in FIG. 1) is provided is that the lower portion 12a of the thermocouple 12 remains in contact with the powder when the assembly 10 is used in an inverted orientation.

It is also desirable that the thermocouple assembly 10 be provided with a cap 22. The cap 22 not only functions to seal the open top 16b of the housing 16 to prevent contamination of the contents thereof, but also to guide thermocouple leads 24, through a well 22a formed therein, to a desired test instrument or monitoring device (not shown). Preferably, the cap 22 is made of resilient material, such as rubber, so that it also serves to relieve any strain on the thermocouple leads 24. If desired, a second well 22b may be formed on the underside of the cap 22. The well 22b is dimensioned to snugly receive the upper portion 12b of the thermocouple 12 so that the thermocouple 12 is more securely held in place in the housing 16. Further, a vent 26 may be provided in the cap 22 to permit escape of heated air and thus prevent rupture or explosion of the protective housing 16 when high temperatures are measured by means of the thermocouple assembly 10.

The thermocouple assembly 10 depicted in FIG. 1 is preferably fabricated by the following process. The ring 18 is first attached to the thermocouple 12 at a predetermined position thereon. Two crimp-on stops 20 are then affixed to the thermocouple 12 abutting the upper and lower surfaces of the ring 18, respectively. The stops 20 tightly grip the thermocouple 12 and serve to more securely hold the ring 18 in place on the thermocouple 12. A desired amount of powder 14 is then introduced into the housing 16. The thermocouple 12, with the ring 18 and the stops 20 attached, is then inserted into the housing 16. Advantageously, the snug-fitting ring 18 tends to sweep downward any powder adhering to the inner wall 16a of the housing 16, which tends to drive the powder toward the closed end of the housing 16. Finally, the cap 22 is mounted onto the open top 16b of the housing 16 with the thermocouple leads 24 first threaded through the well 22a.

Note that the crimp-on stops 20 serve to hold the ring 18 in place during insertion of the thermocouple 12 into the housing 16. More specifically, the frictional engagement of the ring 18 with the inner wall 16a of the housing 16 may cause the ring 18 to move along the thermocouple 12 during insertion process if no such stops 20 are provided. Provision of stops 20 also enables one to disassemble the thermocouple assembly 10 without much difficulty when replacement of the ring 18, the thermocouple 12, the powder 14 or the housing 16 becomes necessary.

In an alternative embodiment of the present invention, if a "bare junction" thermocouple is used, meaning that an electrically conductive material such as pulverized aluminum would tend to short circuit the thermocouple, one may substitute another material for the powder 14. For example, glass powder is a good electrical insulator as well as a relatively good thermal conductor.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A thermocouple assembly comprising:
    a thermocouple;
    a protective housing surrounding the thermocouple and having a closed bottom, the housing being thermally stable within the range of temperatures to be measured by the thermocouple;
    a quantity of a thermally conductive powder deposited at the bottom of the housing between an inner wall of the housing and the thermocouple, the powder having a melting point above the range of temperatures to be measured by the thermocouple; and
    means for suspending the thermocouple in the housing and confining the powder in the housing including a compressible ring whose inner wall fits snugly against the thermocouple and whose outer wall fits snugly against the inner wall of the housing, the ring being capable of maintaining its compressibility within the range of temperatures to be measured by the thermocouple, and a pair of crimp-on stops which frictionally grip the thermocouple and abut the upper and lower surfaces of the ring, respectively.

2. The assembly defined in claim 1 wherein the housing has an open top and further comprising resilient means for closing the top of the housing.

3. The assembly defined in claim 2 wherein the closing means has an elongated central well which snugly receives one end of the thermocouple.

4. The assembly defined in claim 2 wherein the closing means includes a vent.

5. The assembly defined in claim 1 wherein the housing is a glass tube.

6. The assembly defined in claim 1 wherein the ring is made of foamed silicone rubber.

7. The assembly defined in claim 1 wherein the thermocouple is metal-sheathed.

8. The assembly defined in claim 1 wherein the powder is pulverized aluminum.

9. A thermocouple assembly comprising:
    a thermocouple;
    a protective housing surrounding the thermocouple and having a closed bottom, the housing being thermally stable within a range of temperatures to be measured by the thermocouple; and
    first means, disposed within the housing, for enhancing thermal conduction between the housing and thermocouple and for relieving temperature-induced stress therefrom, said first means including a quantity of thermally conductive material disposed at the bottom of the housing between an inner wall of the housing and the thermocouple and a compressible ring whose inner wall fits snugly against the thermocouple and whose outer wall fits snugly against the inner wall of the housing, the ring being capable of maintaining its compressibility within the range of temperatures to be measured by the thermocouple, and a pair of crimp-on stops which frictionally grip the thermocouple and abut the upper and lower surfaces of the ring, respective.

10. The assembly defined in claim 9 wherein the ring is made of foamed silicone rubber.

11. The assembly defined in claim 9 wherein the housing has an open top and further comprising resilient means for closing the top of the housing.

12. The assembly defined in claim 11 wherein the closing means has an elongated central well which snugly receives one end of the thermocouple.

13. The assembly defined in claim 11 wherein the closing means includes a vent.

14. The assembly defined in claim 9 wherein the housing is a glass tube.

15. The assembly defined in claim 9 wherein the material is pulverized aluminum.

16. The assembly defined in claim 9 wherein the material is electrically nonconductive.

17. A process for making a thermocouple assembly, the process comprising:

depositing a quantity of a thermally conductive material in a protective housing;

attaching to a thermocouple a a compressible ring and a pair of crimp-on stops against the upper and lower surfaces of of the ring, respectively, for maintaining the material within the housing, the ring having an inner wall which frictionally engages with the thermocouple and an outer wall that fits snugly against an inner wall of the housing; and inserting the thermocouple and attached ring and stops into the housing such that a portion of the thermocouple is in contact with the material and the thermocouple is suspended within the housing.

18. The process defined in claim 17 wherein the ring is made of foamed silicone rubber.

19. The process defined in claim 17 wherein the housing has an open top through which the material is deposited and the thermocouple is inserted.

20. The process defined in claim 19 further comprising the step of mounting a resilient cap onto the opening of the housing.

21. The process defined in claim 17 wherein the thermocouple is metal-sheathed.

22. The process defined in claim 17 wherein the housing is a glass tube.

23. The process defined in claim 17 wherein the material is pulverized aluminum.

24. The process defined in claim 17 wherein the material is electrically nonconductive.

* * * * *